(12) United States Patent
Chen et al.

(10) Patent No.: US 11,976,709 B2
(45) Date of Patent: May 7, 2024

(54) SERVO AND ROBOT

(71) Applicant: ROBOSEN ROBOTICS (SHENZHEN) CO., LTD., Shenzhen (CN)

(72) Inventors: Xiaosen Chen, Beijing (CN); Liming Zheng, Beijing (CN)

(73) Assignee: ROBOSEN ROBOTICS (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/882,512

(22) Filed: Aug. 5, 2022

(65) Prior Publication Data

US 2023/0055029 A1 Feb. 23, 2023

(30) Foreign Application Priority Data

Aug. 18, 2021 (CN) .......................... 202121934048.1

(51) Int. Cl.
| | | |
|---|---|---|
| *F16H 1/20* | (2006.01) | |
| *B25J 9/12* | (2006.01) | |
| *F16H 55/06* | (2006.01) | |
| *F16H 57/02* | (2012.01) | |
| *F16H 57/031* | (2012.01) | |
| *H02K 7/116* | (2006.01) | |

(52) U.S. Cl.
CPC .................. *F16H 1/20* (2013.01); *B25J 9/12* (2013.01); *F16H 55/06* (2013.01); *F16H 57/031* (2013.01); *H02K 7/116* (2013.01); *F16H 2057/02034* (2013.01)

(58) Field of Classification Search
CPC . H02K 7/116; F16H 2057/02034; F16H 1/20; F16H 57/031
See application file for complete search history.

(56) References Cited

U.S. PATENT DOCUMENTS

| 4,147,071 | A * | 4/1979 | Scribner ................. F16H 57/12 |
| | | | 74/421 A |
| 6,255,751 | B1 | 7/2001 | Hoffmann |
| 8,957,559 | B2 * | 2/2015 | Schneider .............. H02K 7/116 |
| | | | 310/43 |
| 2003/0068177 | A1 * | 4/2003 | Kitayama ............ G03G 15/757 |
| | | | 399/167 |
| 2011/0257053 | A1 * | 10/2011 | Akao .................. C10M 169/044 |
| | | | 184/6.12 |
| 2015/0064045 | A1 * | 3/2015 | Jinnou ....................... C22C 9/10 |
| | | | 419/10 |
| 2019/0097491 | A1 | 3/2019 | Xiong et al. |
| 2019/0097496 | A1 * | 3/2019 | Xiong .................. H02K 11/215 |

(Continued)

FOREIGN PATENT DOCUMENTS

| CN | 204076286 U | * | 1/2015 |
| CN | 205950775 U | | 2/2017 |

(Continued)

*Primary Examiner* — Jake Cook
(74) *Attorney, Agent, or Firm* — MASCHOFF BRENNAN; Ran Pang; Liang Huang (57) ABSTRACT

A servo and a robot with the same are provided. The servo comprises a servo body, an upper cover, a lower cover, and a gear set having a plurality of gears meshing with each other. The gear set is located in the servo body, and comprises an output gear located in the center of the servo body as seen from the cross section of the servo body.

11 Claims, 5 Drawing Sheets

(56) References Cited

U.S. PATENT DOCUMENTS

| | | | | |
|---|---|---|---|---|
| 2019/0120400 A1* | 4/2019 | Delannes | .............. | F16K 31/046 |
| 2019/0352098 A1* | 11/2019 | Levine | .................. | F16H 57/025 |
| 2019/0368594 A1* | 12/2019 | Sakata | ..................... | B25J 9/042 |
| 2020/0198126 A1* | 6/2020 | Chen | ........................ | B25J 9/102 |
| 2020/0233448 A1* | 7/2020 | Chen | .................... | H02K 11/215 |
| 2020/0378482 A1* | 12/2020 | Blesener | ................ | H02K 7/116 |
| 2022/0268321 A1* | 8/2022 | Kobayashi | ................ | F16H 1/20 |

FOREIGN PATENT DOCUMENTS

| | | | |
|---|---|---|---|
| CN | 107387676 | A | 11/2017 |
| CN | 207616609 | U | 7/2018 |
| CN | 207691612 | U | 8/2018 |
| CN | 109573070 | A | 4/2019 |
| CN | 209793734 | U | 12/2019 |
| CN | 212115085 | U | 12/2020 |
| CN | 212421359 | U | 1/2021 |
| CN | 215733875 | U | 2/2022 |
| DE | 102019103421 | A1 | 8/2019 |
| FR | 3086814 | A1 | 4/2020 |
| JP | 2007292200 | A | 11/2007 |
| JP | 2012191769 | A | 10/2012 |
| JP | 2014084989 | A | 5/2014 |
| JP | 2015181804 | A | 10/2015 |
| JP | 2017013620 | A | 1/2017 |
| KR | 1020170132009 | A | 1/2017 |

\* cited by examiner

SERVO AND ROBOT

CROSS REFERENCE TO RELATED APPLICATION

This application claims priority to Chinese Patent Application No. 202121934048.1, filed on Aug. 18, 2021, the content of which is hereby incorporated by reference in its entirety for all purposes.

TECHNICAL FIELD

The present disclosure relates to the technical field of robot accessories, and particularly to a servo and a robot comprising the servo.

BACKGROUND

The servo is mainly composed of a circuit board, a motor, a reduction gear set, a sensor, and a control circuit. The working principle of the servo is that a main control board of a robot sends a control signal to the servo, a single-chip microcomputer on the circuit board of the servo performs corresponding processing, determines a direction of rotation and then drives a coreless motor to start to rotate, and then power is transmitted to a swinging arm through the reduction gear set, and at the same time, a detection signal is sent back by a position detection sensor, so as to determine whether a predetermined position has been reached. A servo is a power source for a remote control model or a humanoid robot to control actions, and is also an important motion execution device that drives the motion of a joint of the robot.

For example, the Chinese utility model patent with the publication number CN207616609U discloses a servo and a robot. The servo comprises a housing, a reduction mechanism, a motor, a control board, a control wire and a potentiometer, wherein the reduction mechanism comprises an output bearing, an output gear set and a variable speed gear set; one end of the output bearing is connected to a potentiometer shaft, and the other end of the output bearing is connected to an output gear set shaft; the variable speed gear set is connected to a motor shaft, and the output gear set meshes with the variable speed gear set; and the potentiometer is electrically connected to the control board via the control wire, and the motor is electrically connected to the control board.

SUMMARY

According to an aspect of embodiments of the present disclosure, provided is a servo, comprising a servo body, an upper cover, a lower cover, and a gear set having a plurality of gears meshing with each other, wherein the gear set is located in the servo body, and comprises an output gear located in the center of the servo body as seen from the cross section of the servo body.

According to another aspect of the embodiments of the present disclosure, provided is a robot, comprising the servo described above.

According to the embodiments of the present disclosure, a servo adaptable to a robot with a small internal space, and a small-size robot can be provided.

BRIEF DESCRIPTION OF THE DRAWINGS

The above and other features and advantages of the embodiments of the present disclosure will be more apparent to those of ordinary skill in the art from the following detailed description of the embodiments of the present disclosure with reference to the accompanying drawings, in which.

LIST OF REFERENCE NUMERALS 1 servo body, 12 coreless motor, 13 first-stage gear, 14 second-stage gear, 15 third-stage gear, 16 fourth-stage gear, 17 fifth-stage gear, 18 sixth-stage gear, 19 copper ring, 20 output gear, 21 servo PCB, 22 potentiometer, 23 motor gear, 24 coupling, 25 round hole, 2 upper cover, 3 lower cover, 4 screw, 5 upper wire outlet structure, 6 lower wire outlet structure, and 7 connecting socket.

DETAILED DESCRIPTION OF EMBODIMENTS

For a clearer understanding of the technical features, objectives and effects of the present disclosure, specific embodiments of the present disclosure will now be described with reference to the accompanying drawings. The same reference numerals refer to the same or similar elements throughout the figures. For the sake of brevity of the drawings, only the parts relevant to the present disclosure are exemplarily shown in the figures, and they do not represent the actual structure as a product.

The word "exemplary" represents "serving as an instance, example or description" herein, and any illustration and implementation described as "exemplary" herein should not be interpreted as a more preferred or more advantageous technical solution.

It should be noted that directional indications (such as top, bottom, up, down, left, right, front, and back) in the embodiments of the present disclosure are only used to explain the relative positional relationship and movement between components in a specific posture (e.g., a posture as shown in the figures), and when the specific posture changes, the directional indications also change accordingly.

In the present disclosure, unless otherwise expressly specified and defined, the terms such as "connection" and "fixing" should be interpreted broadly. For example, "fixing" may be a fixed or detachable connection, or integration; may be a mechanical connection, or an electrical connection; or may be a direct connection or an indirect connection through an intermediate medium, or may be communication between interiors of two elements or interaction between two elements, unless it may be clearly defined otherwise.

In the present disclosure, unless otherwise stated, the use of terms "first", "second", etc., to describe various elements is not intended to limit the positional relationship, temporal relationship or importance relationship of these elements, and such terms are only used to distinguish one element from another. In some examples, the first element and the second element may refer to the same instance of the element, and in some cases, based on contextual descriptions, the first element and the second element may also refer to different instances.

The following description is merely exemplary in nature and is not intended to limit the present disclosure, application, or uses. The specific embodiments of a servo of the present disclosure will be further described below with reference to the accompanying drawings of the specification.

Figure 1:
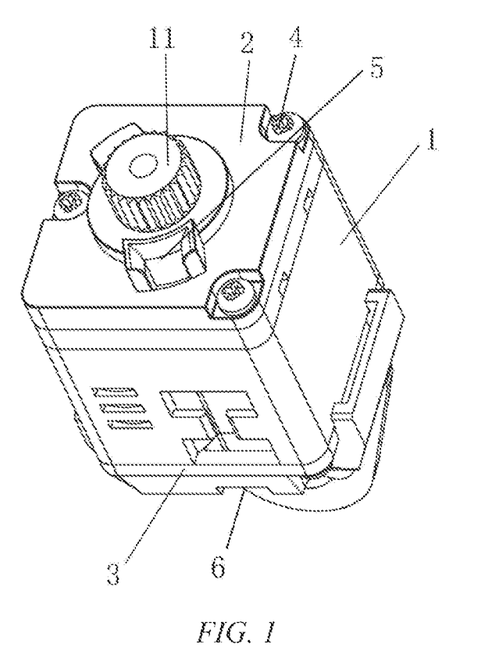
FIG. 1 is a schematic structural diagram of a servo according to some exemplary embodiments of the present disclosure.
Figure 2:
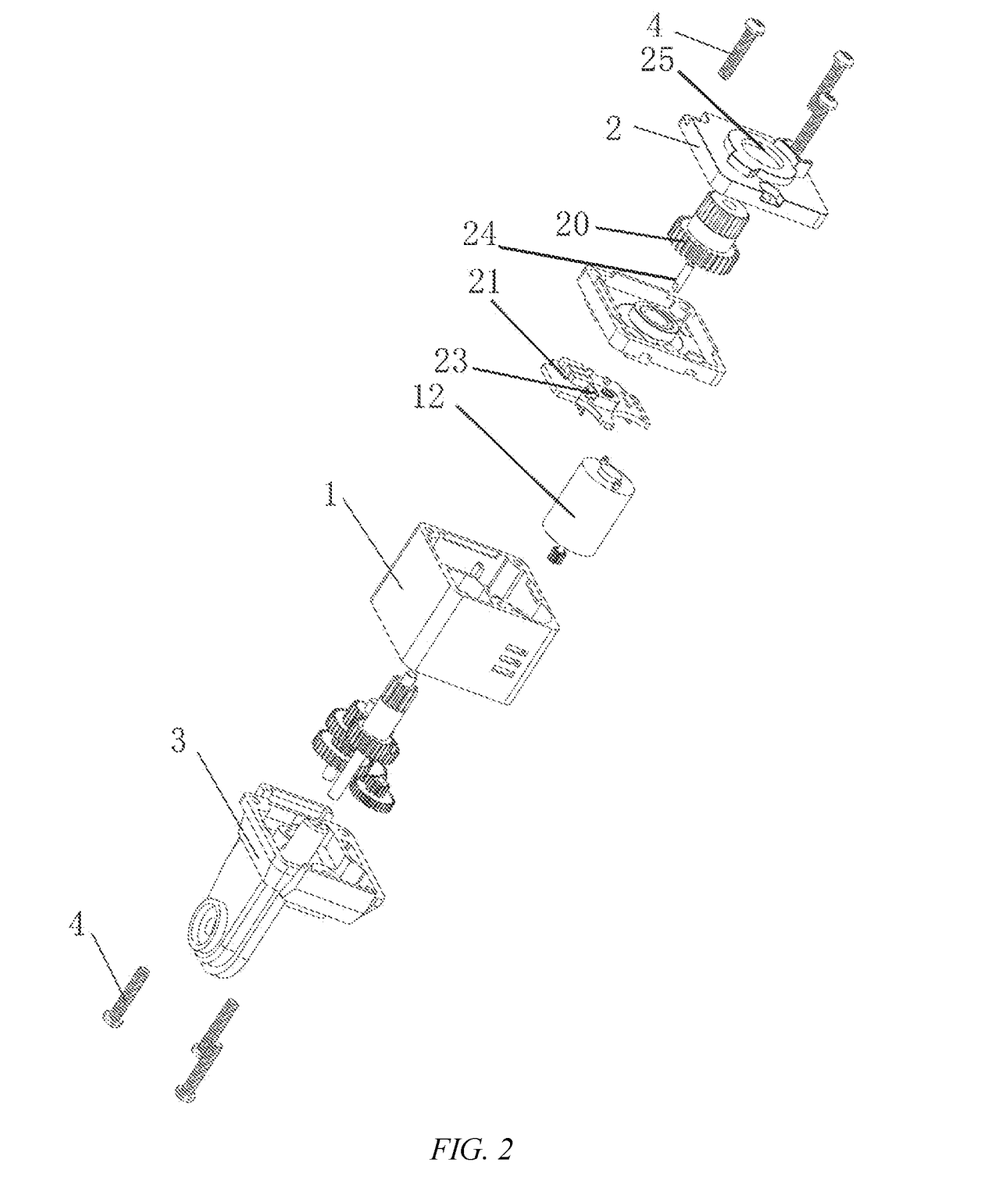
FIG. 2 is an exploded schematic diagram of a servo according to some exemplary embodiments of the present disclosure.
Figure 3:
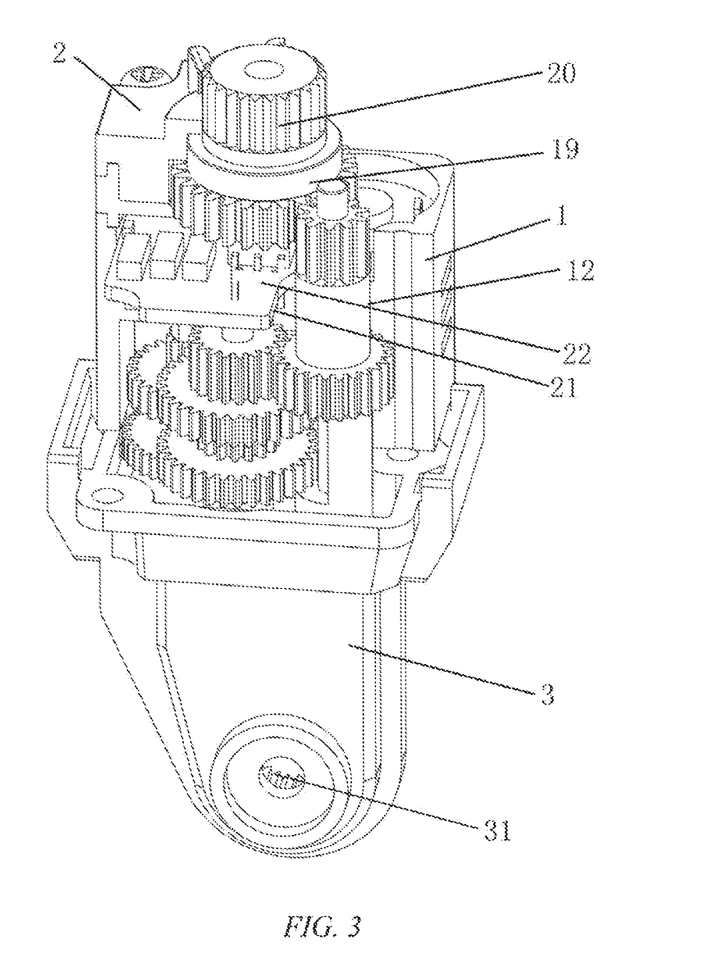
FIG. 3 is a schematic diagram of an internal structure of a servo according to some exemplary embodiments of the present disclosure.

FIG. 1 shows a schematic structural diagram of a servo according to some exemplary embodiments of the present disclosure. FIG. 2 is an exploded schematic diagram of a servo according to some exemplary embodiments of the present disclosure. FIG. 3 is a schematic diagram of an internal structure of a servo according to some exemplary embodiments of the present disclosure.

According to an aspect of embodiments of the present disclosure, provided is a servo, comprising a servo body 1, an upper cover 2, a lower cover 3, and a gear set having a plurality of gears meshing with each other, wherein the gear set is located in the servo body 1, and comprises an output gear 20 located in the center of the servo body 1. According to the embodiments of the present disclosure, an internal space of a housing of the servo can be effectively used, and the servo can be used as a servo for the biceps of a robot, so that the biceps of the robot is centered and rotates normally.

In some embodiments, the servo is elongated and suitable to be used as a biceps joint of a robot. For example, the overall size of the servo is 53.4 mm×26.4 mm×22.5 mm. It is obvious from the size that the servo is thin and tall, suitable to be used as the biceps joint, and easy to be embedded into the upper arm of the robot.

In some embodiments, the servo comprises a motor. In a robot, it is necessary for the motor to have a small size and be capable of providing a strong torque. In some examples, the motor is of a coreless structure, so that the torque can be released to the utmost extent. A locked-rotor torque can reach 35 g·cm, which is very strong.

In some embodiments, the coreless motor 12 is arranged below the output gear 20, and a potentiometer 22 is arranged between the output gear 20 and the coreless motor 12. Since the motor is arranged below the output gear, the potentiometer can be arranged between the motor and the output gear to detect an angle of the output gear.

In some embodiments, the potentiometer 22 is fixed to a servo printed circuit board (PCB) 21. For example, as shown in FIG. 3, the servo PCB 21 is located below the output gear 20 and beside the coreless motor, so that the potentiometer 22 fixed to the PCB 21 is located between the output gear 20 and the coreless motor 12. In some examples, when a cylindrical coreless motor is used, a rear end of the servo PCB 21 is cut in a circle. As shown in FIG. 3, the end of the servo PCB 21 close to the coreless motor is cut to form a circular notch, and the coreless motor passes through the notch, thereby saving the space. In some examples, the servo PCB is thickened by 1.0 mm.

In some embodiments, a servo plate 31 is arranged below the lower cover 3 to prepare for connection to a forearm servo. Therefore, the servo can drive the forearm to move normally while making the biceps of the robot centered and rotate normally.

In some embodiments, the servo has an upper wire outlet structure 5 and a lower wire outlet structure 6. For example, in the embodiment shown in FIG. 1, the upper wire outlet structure 5 is arranged on the upper cover 2, and the lower wire outlet structure 6 is arranged on the lower cover 3. When the potentiometer is located in the middle of the servo body, with the arrangement of the upper wire outlet structure 5 and the lower wire outlet structure 6, the internal space of the housing can be effectively used.

In some embodiments, the servo further comprises an upper lead wire and a lower lead wire. A wiring method is, for example, as follows: the upper lead wire passes through the upper cover 2 and is soldered to the servo PCB 21, the potentiometer 22 is fixed to the servo PCB 21 with a small hole in the potentiometer 22 matching a potentiometer shaft on the output gear 20, and is then covered by the circuit board, and the upper lead wire is led out from a hole of the upper wire outlet structure 5 on the upper cover 2; and the lower lead wire is led out from the servo PCB 21, the potentiometer 22 is fixed to the servo PCB 21 with a small hole in the potentiometer 22 matching a potentiometer shaft on the output gear 20, and is then covered by the circuit board, and the lower lead wire is led out from a hole of the lower wire outlet structure 6 on the lower cover 3.

Figure 5:
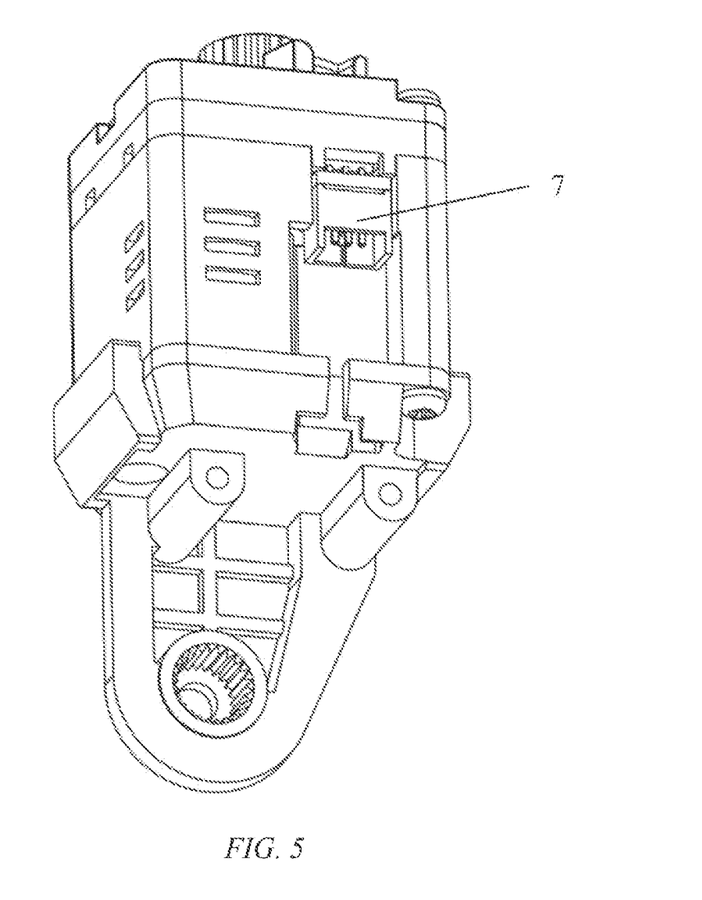
FIG. 5 is a schematic structural diagram of a servo according to some other exemplary embodiments of the present disclosure.

In some embodiments, the servo comprises a connecting socket 7 configured to create a plug-in electrical connection with another servo. The connecting socket 7 is arranged on the outer side of the servo and is configured to be electrically connected to the PCB 21. By means of the connecting socket 7, electrical connection with that other servo can be facilitated.

For example, in the embodiment shown in FIG. 5, the connecting socket 7 is arranged in the form of a receptacle on the outer side of the servo body 1, is electrically connected to the PCB 21 located in the servo body 1, and is configured to create a plug-in connection with a connecting socket on another servo, such as a forearm servo. The lower lead wire and the lower wire outlet structure 6 can be replaced by the connecting socket 7.

Figure 4:
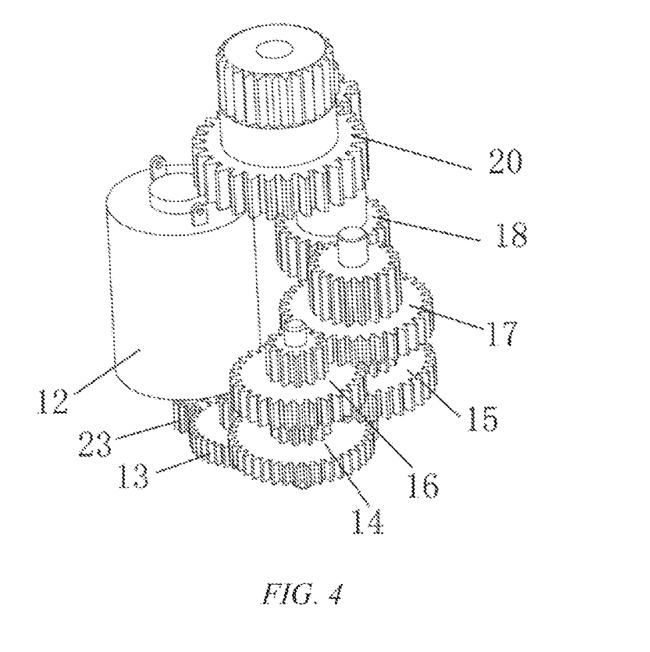
FIG. 4 is a schematic structural diagram of a gear set in a servo according to some exemplary embodiments of the present disclosure.

In some embodiments, the gear set comprises a plurality of gears meshing with each other. FIG. 4 shows a schematic structural diagram of a gear set in a servo according to some exemplary embodiments of the present disclosure. In the embodiment shown in FIG. 4, a first-stage gear 13, a second-stage gear 14, a third-stage gear 15, a fourth-stage gear 16, a fifth-stage gear 17, a sixth-stage gear 18 and a motor gear 23 are further arranged in the servo body 1. The motor gear is connected to an output shaft of the motor (e.g., the coreless motor 12). The whole gear set is generally axially arranged side-by-side with the coreless motor 12, the motor gear 23 is connected to the output shaft of the coreless motor, and the output gear 20 is located on the side of the coreless motor 12 opposite to its output shaft, so that the space can be saved and the overall elongated servo can be achieved. In some examples, in order to reduce noise, motor teeth are made of a copper alloy material.

A working process of the gear set is, for example, as follows: the motor gear 23 movably meshes with the first-stage gear 13; a first-stage pinion is also mounted on a rotating shaft of the first-stage gear 13, and the first-stage pinion is located above the first-stage gear 13 and is coaxially connected to the first-stage gear 13; the first-stage pinion movably meshes with the second-stage gear 14, a second-stage pinion is sleeved over a rotating shaft of the second-stage gear 14, and the second-stage pinion is located above the second-stage gear 14 and is coaxially fixedly connected to the second-stage gear 14; the second-stage pinion movably meshes with the third-stage gear 15, a third-stage pinion is also sleeved over a rotating shaft of the third-stage gear 15, and the third-stage pinion is located above the third-stage gear 15 and is coaxially connected to the third-stage gear 15; the third-stage pinion movably meshes with the fourth-stage gear 16, a fourth-stage pinion is sleeved over a rotating shaft of the fourth-stage gear 16, and the fourth-stage pinion is located above the fourth-stage gear 16 and is coaxially fixedly connected to the fourth-stage gear 16; the fourth-stage pinion movably meshes with the fifth-stage gear 17, a fifth-stage pinion is also sleeved over a rotating shaft of the fifth-stage gear 17, and the fifth-stage pinion is located above the fifth-stage gear 17 and is coaxially connected to the fifth-stage gear 17; and the fifth-stage pinion movably meshes with the sixth-stage gear 18, a sixth-stage pinion is sleeved over a rotating shaft of the sixth-stage gear 18, the sixth-stage pinion is located above the sixth-stage gear 18 and is coaxially fixedly connected to the sixth-stage gear 18, and the sixth-stage pinion movably meshes with an input gear at an input end (i.e., the end that meshes with the sixth-stage pinion) of an output shaft of the output gear 20. An output end 11 of the output shaft of the output gear 20 passes through the upper cover 2 and is exposed outside the upper cover 2.

In some embodiments, a gear shaft of the first-stage gear 13 has a diameter of 1.2 mm; a gear shaft of each of the second-stage gear 14 and the fourth-stage gear 16 has a diameter of 1.5 mm; a gear shaft of each of the third-stage gear 15 and the fifth-stage gear 17 has a diameter of 2.0 mm; a gear shaft of the sixth-stage gear 18 has a diameter of 2.0 mm; and a gear shaft of the output gear 20 has a diameter of 8.0 mm.

In some embodiments, the first-stage gear 13, the second-stage gear 14, the third-stage gear 15, the fourth-stage gear 16, the fifth-stage gear 17 and the sixth-stage gear 18 are made of iron teeth and aluminum alloy teeth. That is, some of the gears use iron teeth, and some use aluminum alloy teeth. In some other embodiments, at least one of the first-stage gear 13, the second-stage gear 14, the third-stage gear 15, the fourth-stage gear 16, the fifth-stage gear 17 and the sixth-stage gear 18 and their respective pinions that are coaxially fixedly connected thereto use iron teeth or aluminum alloy teeth. For example, their respective pinions use iron teeth to withstand larger forces; and the first-stage gear 13, the second-stage gear 14, the third-stage gear 15, the fourth-stage gear 16, the fifth-stage gear 17 and the sixth-stage gear 18 use aluminum alloy teeth due to large size. The output gear 20 uses aluminum alloy teeth.

In some embodiments, the output gear 20 and the potentiometer are connected via a coupling 24, wherein a first end of the coupling is inserted into the output gear and a second end of the coupling is inserted into a hole in the potentiometer. In some examples, the output gear 20 is made from an aluminum alloy material, so that a part of the coupling can be pressed into the gear to form a tight fit. The coupling is machined from 304 stainless steel, for example. In some examples, a lower section (the second end that is inserted into the potentiometer) of the coupling is a D-shaped head configured to be directly inserted into the potentiometer. The potentiometer has a D-shaped hole matching the D-shaped head of the coupling. For example, the D-shaped hole has a diameter of 1.4 mm and a depth of 2 mm. Correspondingly, the lower section of the coupling is designed, for example, to have a diameter of 1.4 mm and a length of 2 mm. In some examples, the potentiometer is a potentiometer capable of 360° continuous rotation and having an electrical range of 280°.

In some embodiments, an end portion of the upper cover 2 is provided with a round hole 25 through which the output gear 20 in the servo body 1 passes.

In some embodiments, the servo body 1, the upper cover 2 and the lower cover 3 are all provided with threaded holes, and the upper cover 2, the servo body 1 and the lower cover 3 are connected together via screws that pass through the threaded holes.

For example, three corners of the servo body 1 are provided with threaded holes; three corners of the upper cover 2 are provided with threaded holes corresponding to the threaded holes formed in the servo body 1; and three corners of the lower cover 3 are provided with threaded holes corresponding to the threaded holes formed in the servo body 1 and the upper cover 2. The upper cover 2, the servo body 1 and the lower cover 3 may be connected together by using three upper and three lower screws 4 that pass through the threaded holes. For another example, as shown in FIG. 2, two adjacent corners of the servo body 1 and the middle of a side wall opposite to the two corners are respectively provided with a threaded hole; and threaded holes are respectively provided in the upper cover 2 at positions corresponding to the threaded holes of the servo body 1, and threaded holes are respectively provided in the lower cover 3 at positions corresponding to the threaded holes of the servo body 1.

During assembling, for example, corresponding snap grooves of the upper cover 2, the servo body 1 and the lower cover 3 are snap-fitted together first, then three screws 4 are respectively inserted into the upper cover 2 to connect the upper cover 2 and the servo body 1 together, and finally another three screws 4 are inserted into the lower cover 3 to connect the lower cover 3 and the servo body 1 together. It can be understood by those skilled in the art that the assembling may be carried out in another sequence of steps that is different from the sequence of steps described above.

The servo is designed in the form of the upper cover and the lower cover each being provided with three screws. Compared with the traditional servo design that generally uses four screws, it is possible to achieve a smaller size of normal section, and to be adaptable to a robot with a small internal space.

In some embodiments, the gear shaft of the output gear 20 is provided with an oil-impregnated bearing 19.

According to another aspect of the embodiments of the present disclosure, provided is a robot, comprising the servo according to any one of the foregoing embodiments.

It is not difficult for those skilled in the art to understand that the servo of the present disclosure includes any combination of various parts in this specification. These combinations are not described in detail herein for the sake of conciseness of the specification. However, after reading this specification, the scope of the present disclosure, which is constituted by any combination of the parts in this specification, has been obvious.

What is claimed is:
1. A servo, comprising:
a servo body;
an upper cover;
a lower cover;
a gear set having a plurality of gears meshing with each other, wherein:
the gear set is located in the servo body, and
the gear set comprises an output gear, a longitudinal central axis of the output gear coincides with a longitudinal central axis of the servo body;
a coreless motor, wherein the output gear and an output shaft of the coreless motor are located on opposite ends of the coreless motor; and
a potentiometer, wherein:
the coreless motor is arranged below the output gear, and the potentiometer is arranged between the output gear and the coreless motor.

2. The servo according to claim 1, wherein:

the servo further comprises a servo printed circuit board (PCB), and the potentiometer is fixed to the servo PCB.

3. The servo according to claim 1, wherein a servo plate is arranged below the lower cover and configured to be connected to a forearm servo.

4. The servo according to claim 1, wherein:

the servo has an upper wire outlet structure and a lower wire outlet structure, the upper wire outlet structure is arranged on the upper cover, and the lower wire outlet structure is arranged on the lower cover.

5. The servo according to claim 1, wherein:

the gear set further comprises a first-stage gear, a second-stage gear, a third-stage gear, a fourth-stage gear, a fifth-stage gear, a sixth-stage gear, and a motor gear which are arranged in the servo body.

6. The servo according to claim 5, wherein:

the motor gear is made of copper alloy;

the first-stage gear, the second-stage gear, the third-stage gear, the fourth-stage gear, the fifth-stage gear and the sixth-stage gear use iron teeth and aluminum alloy teeth; and the output gear uses aluminum alloy teeth.

7. The servo according to claim 1, wherein an end portion of the upper cover is provided with a round hole through which the output gear passes.

8. The servo according to claim 1, wherein:

the upper cover and the lower cover are both provided with a plurality of threaded holes, and the upper cover, the servo body and the lower cover are connected together via a plurality of screws which pass through the threaded holes of the upper cover from above and a plurality of screws which pass through the threaded holes of the lower cover from below.

9. The servo according to claim 1, wherein a gear shaft of the output gear is provided with an oil-impregnated bearing.

10. The servo according to claim 1, wherein:

the servo is provided with a connecting socket arranged on an outer side of the servo body, and the connecting socket is electrically connected to a servo PCB located in the servo body and configured to be in plug-in electrical connection with another servo.

11. A robot, comprising the servo according to claim 1.

* * * * *